(No Model.) 2 Sheets—Sheet 1.
H. HAUSTEIN.
ILLUMINATING TILE.
No. 509,030. Patented Nov. 21, 1893.
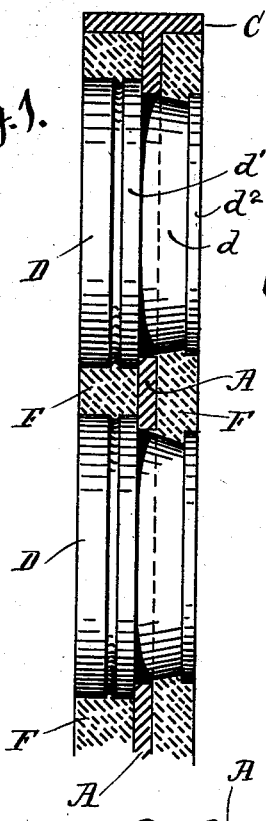
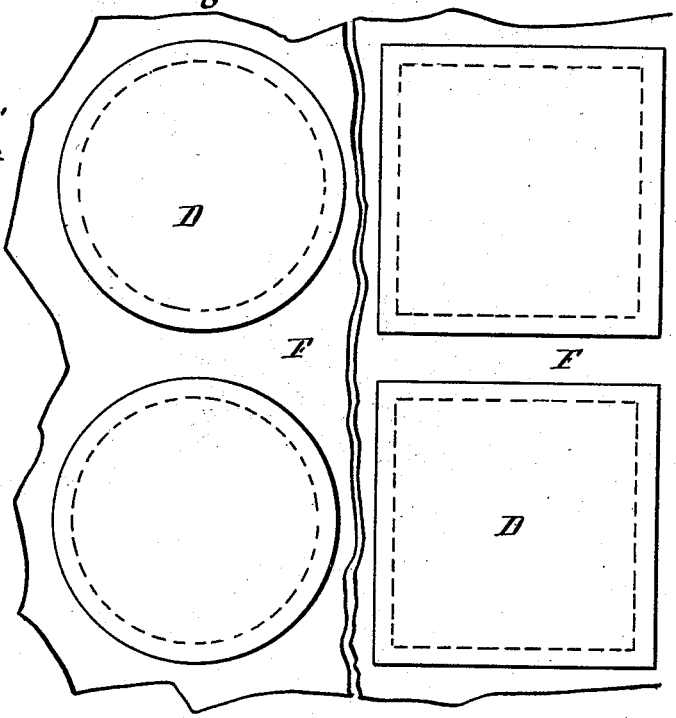
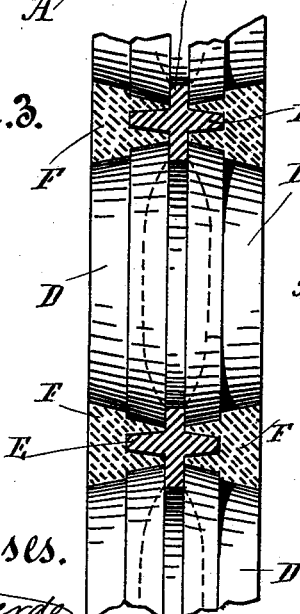
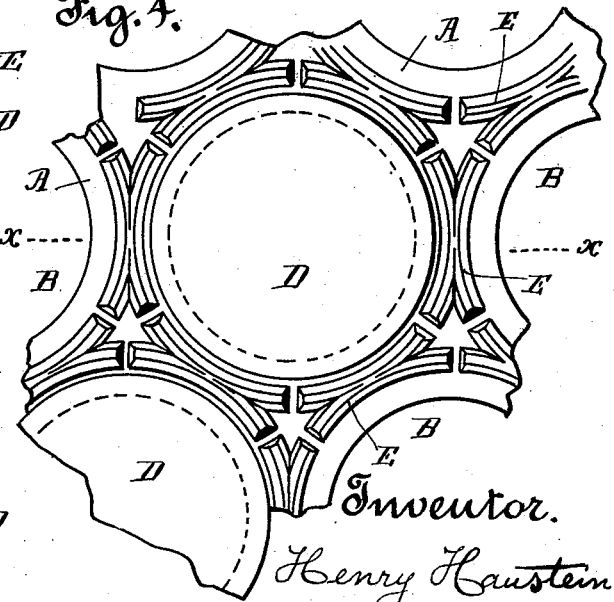
Witnesses.
Inventor.
Henry Haustein
by A. H. Ste Marie
att'y (No Model.) 2 Sheets—Sheet 2.

H. HAUSTEIN.
ILLUMINATING TILE.

No. 509,030. Patented Nov. 21, 1893.

Witnesses.

Inventor.
Henry Haustein
by A. H. Ste Marie
atty

THE NATIONAL LITHOGRAPHING COMPANY,
WASHINGTON, D. C.

UNITED STATES PATENT OFFICE.

HENRY HAUSTEIN, OF SAN FRANCISCO, CALIFORNIA.

ILLUMINATING-TILE.

SPECIFICATION forming part of Letters Patent No. 509,030, dated November 21, 1893.

Application filed April 6, 1893. Serial No. 469,308. (No model.)

*To all whom it may concern:*

Be it known that I, HENRY HAUSTEIN, a citizen of the United States, and a resident of the city and county of San Francisco, State of California, have invented certain new and useful Improvements in and Relating to the Construction of Illuminating-Tiles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has for its object improvements in glazed tiles or covers that are used to convey light into vaults, elevator-shafts, and various apartments in a building.

It consists, in the first place, in providing a novel mode of construction for this class of devices whereby I am enabled to have both faces of the glass flush with the filling on both sides of the supporting plate, and to thereby produce tile-work that looks better finished and transmits more light than is obtainable where one face of the glass is partly concealed within the tile-plate or the filling material thereon.

It further consists in providing the tile-plate, around the openings where the glass lenses are set, with ribs or flanges of peculiar construction, which serve to strengthen the plate and form pockets wherein the filling material may spread and secure a firm hold on said plate and consequently upon the lenses therein.

Figure 5:
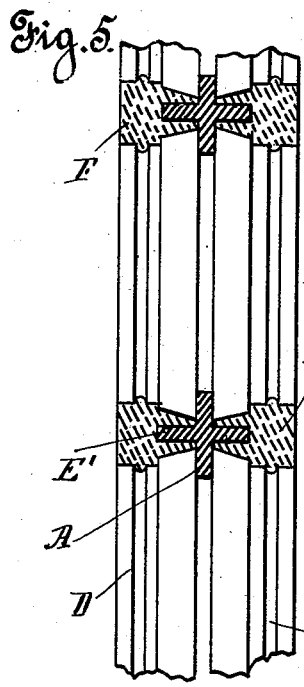
Figure 6:
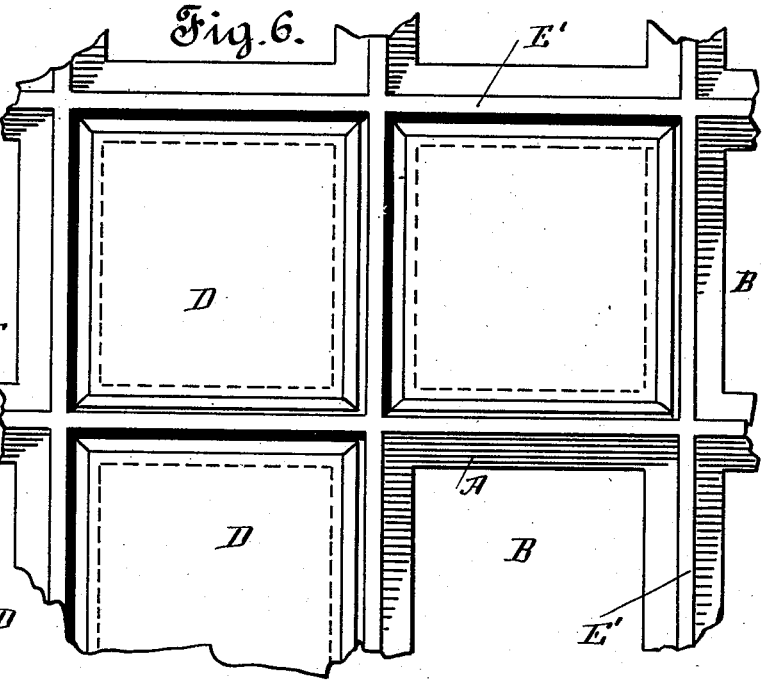
Figure 7:
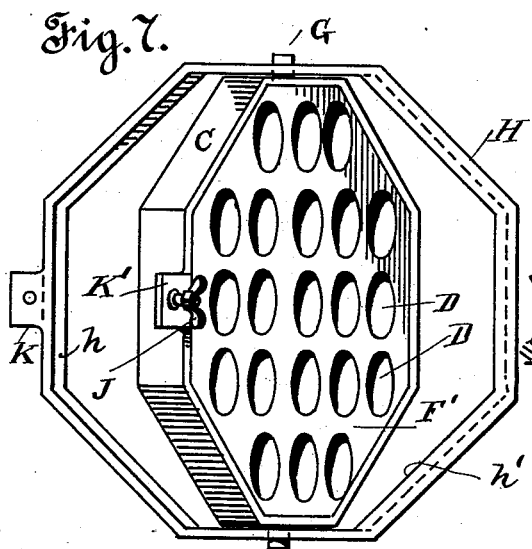
Figure 8:
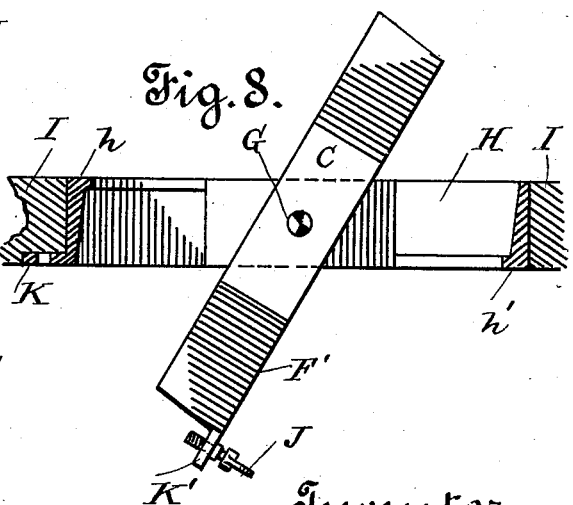

Referring to the drawings,—Figure 1 is a partly-broken sectional elevation of an illuminating-tile with single lenses constructed according to the principle of my invention. Fig. 2 shows two plans of the same, one having round lenses and the other square ones. Fig. 3 is a broken sectional elevation of an illuminating-tile having double lenses and ribs projecting from both sides of the tile-plate. Fig. 4 is a plan of the construction shown at Fig. 3, the latter figure being a section on the line *x x* of said Fig. 4. Fig. 5 is a broken sectional elevation of an illuminating-tile provided with double lenses of quadrangular shape and flanges surrounding the same on both sides of the plate. Fig. 6 is a plan of the tile illustrated at Fig. 5. Fig. 7 is an elevation of an illuminating-tile mounted in and arranged to swing within an outer frame or casing. Fig. 8 is a plan, partly in section, of the tile and frame shown at Fig. 7.

Corresponding parts are indicated by corresponding letters of reference in all the views.

In the figures, A represents a metallic plate or grating provided with light-openings B and surrounded at the ends and sides by flanges C that project laterally from both faces of said plate or grating.

Within or over the openings B are set blocks of glass or lenses D, the outer surfaces of which are brought into line with both edges of the flanges C and therefore with the border flange of the tile-plate on both sides. One or two lenses may be used to fill or cover each opening. Single lenses are preferred for the thinner tiles, but double lenses may be used for the thicker ones. If single lenses are employed they are preferably made as shown at Fig. 1, that is provided with a tapering portion forming a groove $d$ between a central flange $d'$ and an end flange $d^2$. The tapering portion allows the lenses to be readily passed through the light-openings in the plate, on one side of which the central flanges are brough to bear, while the groove is well adapted to hold and retain cement filling that may be packed upon the end flange on the opposite side of said plate. If two lenses are used they may be set with their larger surface next to and covering the light-openings on both sides of the tile-plate, as represented at Figs. 3 and 5. But the lenses may be made and applied in other ways as long as the object of the invention is accomplished, as aforesaid, by exposing the surface of the glass on both sides of the tile.

Around the light-openings and concentrical therewith is a series of ribs E that project outwardly from both sides of the tile-plate. These ribs are cone-shaped in cross-section, curved on both sides, and forked at the ends, as shown at Fig. 4. They thus constitute on each side of the plate, around each opening, broken but interconnected flanges that cover much of the surface of the plate on both sides and at the same time leave empty spaces in and about them forming pockets or cavities in which the plastic material that enters into the composition of illuminating-tiles may be spread, thereby imparting unusual strength to the plate and causing the plastic material to set in such a way as will secure it a firm hold on the plate and the glasses therein.

E' represents plain unbroken flanges that may be used sometimes in place of the ribs E. Like these they project outwardly from both sides of the tile-plate, and they completely surround the light-openings and part of the lens or lenses filling or covering the same. They may be either round or quadrangular in shape, as preferred.

F is the filling material which I use in connection with the plate and the lenses. This, in ordinary cases, may be concrete or cement, but where a fire-proof construction is desirable I prefer the use of plaster of paris, at least on one side of the tile, as at F', Figs. 7 and 8. Whichever filling is used, it is carefully packed in and around the ribs or flanges of the plate between the light-openings and brought up to a level with the outer surfaces of the glass and the ends of the plate on both sides. Thus is formed an illuminating-tile in which the border of the plate, the filling, and the lenses are all in line or on a level on both sides, thereby presenting a neatness of appearance and affording material advantages that are not found in other constructions.

Figs. 7 and 8 illustrate a practical way of setting up my improved tile in place, which consists in providing it with pivot pins G that allow it to swing within an outer frame or casing H located at any suitable point in a partition or wall I where illuminating-tiles are employed. The frame H and the tile therein may be of any convenient shape, but it is thought the octagonal form shown in the drawings will be found generally acceptable. Flanges h h' inwardly projecting from opposite sides of the frame afford bearing points upon which the edges of the tile may rest and prevent it from being swung around indiscriminately. The tile may be fastened and practically locked from the inside by means of a thumb-screw J passing through small plates K K' secured one to the edge of the tile and the other to the edge of the casing. Tiles mounted and arranged in this way may be used with as much advantage in sidewalks as in the partitions or walls of a building. They are invaluable for ventilating purposes and afford besides an important and ready means of escape in a case of fire.

Having described my invention, what I claim, and desire to secure by Letters Patent of the United States, is—

1. An illuminating-tile consisting of a perforated plate provided with flanges on both sides, oppositely-placed lenses covering the openings in said plate on each side and having their outer faces in line with the outer edges of said flanges, and filling between said lenses forming even surfaces on both sides of the tile, substantially as set forth.

2. An illuminating-tile composed of a plate provided with light-openings, lenses therein, and a series of forked ribs disconnected at the forked ends forming cavities in said plate, and filling material, substantially as set forth.

3. An illuminating-tile comprising a plate provided with light-openings, curved ribs having forked ends concentrical with said openings, lenses, and filling, substantially as set forth.

4. An illuminating-tile consisting of a perforated plate, oppositely-placed lenses covering the openings in said plate, a series of internal flanges or ribs surrounding said lenses, and filling material covering said flanges or ribs on both sides of the plate, substantially as set forth.

In testimony whereof I affix my signature in presence of two witnesses.

HENRY HAUSTEIN.

Witnesses:
R. R. STRAIN.
C. H. MARBLE.